US00RE47430E

(19) United States
(12) Reissued Patent
Boeckem et al.

(10) Patent Number: US RE47,430 E
(45) Date of Reissued Patent: Jun. 11, 2019

(54) COORDINATE MEASURING DEVICE HAVING AUTOMATIC TARGET DETECTION

(71) Applicant: Leica Geosystems AG, Heerbrugg (CH)

(72) Inventors: Burkhard Boeckem, Wurenlos (CH); Thomas Leuthi, Aarau (CH)

(73) Assignee: LEICA GEOSYSTEMS AG, Heerbrugg (CH)

(21) Appl. No.: 14/850,103

(22) Filed: Sep. 10, 2015

Related U.S. Patent Documents

Reissue of:
(64) Patent No.: 8,981,297
Issued: Mar. 17, 2015
Appl. No.: 13/639,922
PCT Filed: Apr. 13, 2011
PCT No.: PCT/CH2011/000078
§ 371 (c)(1),
(2) Date: Nov. 16, 2012
PCT Pub. No.: WO2011/127617
PCT Pub. Date: Oct. 20, 2011

(30) Foreign Application Priority Data

Apr. 13, 2010 (EP) ..... 10405078

(51) Int. Cl.
*G01S 17/08* (2006.01)
*G01C 15/00* (2006.01)
(Continued)

(52) U.S. Cl.
CPC ..... *G01C 15/002* (2013.01); *G01S 7/481* (2013.01); *G01S 17/023* (2013.01); *G01S 17/66* (2013.01)

(58) Field of Classification Search
CPC ..... G01C 15/002; G01S 7/481; G01S 17/66; G01S 17/023; G01S 7/4812
(Continued)

(56) References Cited

U.S. PATENT DOCUMENTS 6,504,602 B1 1/2003 Hinderling
7,072,032 B2 7/2006 Kumagai et al.
(Continued)

FOREIGN PATENT DOCUMENTS

CN 1110399 10/1995
DE 10 2008 039 838 3/2010
(Continued)

OTHER PUBLICATIONS

International Search Report dated May 16, 2011, Application No. PCT/CH2011/000078, English translation included.

*Primary Examiner* — Albert J Gagliardi
(74) *Attorney, Agent, or Firm* — Rankin, Hill & Clark LLP

(57) ABSTRACT

A coordinate measuring device includes a carrier that can be rotated automatically about two axes and that can be directed toward a measuring aid. The following are arranged on the carrier so as to be able to move together: an optical distance measuring device for measuring the distance to the measuring aid; a light source for emitting light, directly or by means of optical elements, wherein said light is visible as a target point when reflected on the measuring aid; a target detecting unit for determining a position as the position of the imaging of the target point on a position detection sensor. The control apparatus is designed to direct the carrier at the measuring aid by rotating the carrier about the at least two axes of the carrier according to the fine position and the rough position; and the light source is a superluminescent diode (SLED).

12 Claims, 2 Drawing Sheets

(51) Int. Cl.
*G01S 7/481* (2006.01)
*G01S 17/66* (2006.01)
*G01S 17/02* (2006.01)

(58) Field of Classification Search
USPC ..... 250/339.1; 356/51, 614
See application file for complete search history.

(56) References Cited

U.S. PATENT DOCUMENTS

| | | | | |
|---|---|---|---|---|
| 2002/0180956 | A1 | 12/2002 | Barker | G01S 7/4812 356/121 |
| 2008/0136267 | A1* | 6/2008 | Laabs | G01C 15/002 310/80 |
| 2010/0007739 | A1* | 1/2010 | Otani | E02F 3/847 348/159 |
| 2010/0315619 | A1* | 12/2010 | Luethi | G01S 7/4812 356/5.09 |

FOREIGN PATENT DOCUMENTS

| | | |
|---|---|---|
| EP | 0 559 120 | 9/1993 |
| EP | 2 071 283 | 6/2009 |
| JP | 8-166453 | 6/1996 |
| JP | 2004-170356 | 6/2004 |
| JP | 2008-039600 | 2/2008 |
| JP | 2009-270954 | 11/2009 |
| WO | 2007/079600 | 7/2007 |
| WO | 2009/046763 | 4/2009 |
| WO | 2009/103172 | 8/2009 |

* cited by examiner

COORDINATE MEASURING DEVICE HAVING AUTOMATIC TARGET DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The invention relates to a coordinate measuring device and to a method for operating a coordinate measuring device, according to the precharacterizing clauses of the corresponding independent patent claims.

2. Description of Related Art

In order to measure the position of moving target points, coordinate measuring devices are used, often so-called laser trackers. The term laser tracker is intended to mean devices which comprise at least one distance meter operating with a focused laser beam (referred to in the following description as a measurement beam). With the aid of a mirror which can be rotated about two axes, for example, the direction of the measurement beam is adjusted to the target point and recorded by angle transducers assigned to the rotation axes. The target point to be measured is provided with a retro-reflector (in particular corner cube prism or arrangement of three mirrors placed perpendicularly on one another), the retro-reflector reflecting the measurement beam of the laser tracker incident thereon back to the latter. The reflected measurement beam, in this case, travels coaxially with the emitted measurement beam when the measurement beam strikes the reflector exactly centrally, and with a parallel offset thereto when the measurement beam does not strike the reflector centrally. Depending on the embodiment of the tracker (absolute distance meter or interferometer), an absolute distance between the laser tracker and the target point and/or a change in this distance is deduced from a comparison of the emitted and reflected laser light. The position of the reflector, or of the target point, relative to the tracker is calculated from the angles recorded by the angle transducers and the distance detected by the distance meter.

A part of the reflected measurement beam is conventionally sent onto a PSD (position sensitive device). From the position at which the reflected measurement beam strikes the photosensitive surface of the PSD, the parallel displacement of the reflected measurement beam relative to the emitted measurement beam is deduced. The measurement data, thereby determined, define the parallel offset of the reflected measurement beam and are used for control of the measurement beam direction in such a way that the measurement beam follows the target point (tracking) when the latter moves. This means that corresponding variation of the measurement beam direction, or of the orientation of the mirror which aligns the measurement beam, is used to ensure that the parallel offset between the emitted measurement beam and the reflected measurement beam is reduced, or remains as small as possible.

Such a PSD has a small aperture angle for which reason, as disclosed for example in WO 2007/079600 A1, EP 2 071 283 A2 or WO 2009/046763 A1, a target detection unit may additionally be provided. The target detection unit comprises an image detection device having an image sensor, which moves with the measuring device and has a larger field of view than the optics used for the tracking with the PSD. If the tracker (or coordinate measuring device) loses alignment with the reflector, for example because the reflector has moved too rapidly, or because the measurement beam has been interrupted by an obstacle, the target detection unit can detect the reflector and realign the tracker with the reflector. To this end, the image detection device may have its own light source. It is also possible to configure a device without a PSD and only with (at least) one target detection unit.

Such a light source for an image detection device is selected as a laser diode for devices with sizeable measurement distances, for example in ranges of around 80 to 160 meters. In this way, the required light intensity of the reflected measurement light beam can also be maintained over such large distances. However, the problem arises that a plurality of transverse modes are excited in laser diodes. This gives rise to an asymmetrical, highly granular intensity distribution at the position where the light emerges from the laser diode or the light waveguide (granulation). This granular intensity distribution is imaged onto the image sensor and vitiates the position detection of the measurement light beam by the image sensor. The inaccuracy is further exacerbated when the retro-reflector only images a section of the illumination beam onto the PSD. The reason is that in this case the centroid of the light intensity is subject to strong variations not only due to a spontaneously varying energy distribution into the various modes, but also when the section is displaced, for example when the reflector moves.

Known means for counteracting this effect are, for example:

- before emission, the light emitted by the laser diode is guided through a multimode fiber, which constitutes a scrambler that generates a predetermined distribution of the light energy over the modes.
- decoherence of the emitted light is achieved by radio frequency modulation of the laser diode in the MHz to GHz range.

In the coordinate measuring devices described in WO 2007/079600 A1, problems with granulation effects do not arise since the HeNe laser used in combination with a single-mode glass fiber corresponds to an ideal radiator having one wavelength and a symmetrical, gaussian-distributed beam profile. Owing to the symmetrical beam profile, displacements of the beam can be reliably detected and converted by means of a PSD into position information. The illumination beam is already collimated.

BRIEF SUMMARY OF THE INVENTION

It is an object of the invention to provide a coordinate measuring device and a method for operating a coordinate measuring device, of the type mentioned in the introduction, which allow economical production together with precise measurements.

These objects are achieved by a coordinate measuring device and a method for operating a coordinate measuring device having the features of the corresponding independent patent claims.

The coordinate measuring device comprises: a carrier which can be rotated about at least two axes relative to a base, the carrier being automatically alignable with a spatially mobile measuring aid by means of a closed loop control arrangement by rotation about these at least two axes, wherein at least one set of exit and/or entry optics of the following units is respectively arranged so that said optics can be moved together on the carrier at least one optical distance measuring apparatus for measuring the distance to a spatially mobile measuring aid;

at least one light source for emitting light directly or via optical elements, this light being visible as a target point when reflected by the measuring aid;

at least one target detection unit for determining a position as the position of the image of the target point on a position detection sensor;

the closed loop control arrangement being adapted to align the carrier with the measuring aid by rotation about the at least two axes of the carrier according to the fine position and the coarse position; and the light source being a superluminescent diode (SLED).

In a preferred embodiment of the invention, the coordinate measuring device comprises the following:

as a light source, a first light source in the form of an SLED, preferably in the infrared range, and optical elements for emitting light from this first light source as a first target beam, the target beam being visible as a first target point when reflected by the measuring aid;

a fine target detection unit for determining a fine position as the position of the image of the first target point on a first position detection sensor, the fine target detection unit and the distance measuring apparatus comprising common exit optics.

In another preferred embodiment of the invention, the coordinate measuring device additionally or alternatively comprises the following:

as a light source, a second light source in the form of an SLED, which emits light preferably at least in the infrared range, this light being visible as a second target point when reflected by the measuring aid;

a coarse target detection unit for determining a coarse position as the position of the image of the second target point on a second position detection sensor.

The light source of the fine target detection unit and/or the light source of the coarse target detection unit is thus a super-luminescent diode (SLD or SLED). Such a diode emits incoherent light in a relatively (compared with a laser) broad frequency band. The width (3 dB) of the frequency band preferably lies between 3 nm and 50 nm, in particular between 5 nm and 35 nm, and in particular around 20 nm.

The invention with the use of a broadband source stands in contrast to conventional designs for the illumination of a target detection device, in which laser light sources are deliberately used in order to achieve high powers. It is found that the design of the illumination is markedly simplified: previously used means for generating decoherence of the laser light are obviated. Although SLEDs cannot be operated with such high light powers like laser diodes can, operation with measurement distances of, for example, up to 160 meters is possible. Although SLEDs are many times more expensive than laser diodes (for example forty times), their use is beneficial overall.

Furthermore, it has surprisingly been found that when using SLEDs, even though less light energy is available than in the case of a laser, a higher measurement accuracy can be achieved. The reasons for this are on the one hand the lower granulation at the light point, and on the other hand also that temperature-dependent variations or jumps do not occur in the granulation pattern as with lasers.

The spectrum of the SLED is continuous and relatively broad. In a connected multimode waveguide, therefore, significantly more transverse modes are excited than in the case of conventional laser diodes. Although the spatial illumination profile at the output of the waveguide is therefore still granular, it is significantly less so than in the case of a laser diode. Only minor changes in the illumination image therefore occur in the event of temperature changes.

In the case of an illumination pattern with finer granulation, the imaging of different sections of the illumination pattern onto the PSD does not vitiate the centroid of the intensity distribution as much as in the case of coarse granulation. This is important since the SLED emits highly divergent light. In the case of finer granulation, it is less critical which part of the illumination pattern strikes the reflector, i.e. which section is imaged onto the reflector by the optics.

An advantage over LED light sources—apart from the fact that they are fundamentally unsuitable in terms of power for longer distances—is that the emission characteristic of SLEDs is similar to that of laser diodes, and so the same entry elements into the optics of the measuring device can be used as in the case of laser diodes.

The frequency of the SLED light source may—coordinated with the spectral sensitivity of the associated image sensor—essentially be selected arbitrarily, so that various types of superluminescent diodes can be used (for example with a wavelength of 650, 750, 795, 800, 830, 840, 850, 905, 1270, 1300, 1400, 1480 or 1550 nm). Preferably, the SLED is cooled by a cooling element, for example based on the Peltier principle.

When using an SLED in the coarse target detection unit, the SLED is for example arranged on a front side of the carrier and emits its light via emission optics. The latter expand the light or collimate it.

The closed loop control arrangement can alternatively take the fine position and the coarse position into account, for example by switching over from closed loop control with the aid of the coarse position to the fine position when approaching the target point. It is, however, also possible to provide closed loop control which first simultaneously processes both values and selects, and uses for the closed loop control, only one or both values.

Owing to the arrangement of the exit and/or entry optics of all the units, a compact unit is provided which can fulfill a multiplicity of functions, while having a simple mechanical structure (only two driven axes). All the units are aligned together with the measuring aid or target. With the two target detection units, measuring aids which have not yet been found can be detected, acquired and tracked in a larger range.

Preferably, the optical axis of the fine target detection unit extends outside the coordinate measuring device coaxially with the optical axis of the distance measuring apparatus on a common measurement axis. A prerequisite for this is that the fine target detection unit and the distance measuring apparatus have common exit optics. Common exit optics (or entry optics) of two beam paths means that the two beam paths emerge from the device into the environment of the device, or enter the device from the environment of the device, through the same optical element, such as a lens or a disk. In general, the beam paths are in this case at least approximately coaxial.

In another preferred embodiment of the invention, the optical axes of the fine target detection unit and of the coarse target detection unit do not extend coaxially outside the carrier. In this case, the optical axes therefore extend either through the same exit optics, but not coaxially, or they extend through separate exit optics.

Typically, the fine target detection unit has an aperture angle or angle of view of less than 1° or less than 2° or less than 3°. Preferably, the coarse target detection unit has an aperture angle of more than 3° or more than 10° or more than 15° and preferably up to around 30° (i.e. ±15°).

In a preferred embodiment of the invention, the fine target detection unit and the coarse target detection unit are sensitive in mutually separate ranges of the infrared spectrum (i.e. respectively either the corresponding sensor or the combination of the sensor with a filter). In this case, the fine target detection unit is sensitive to the light of the infrared light source and the coarse target detection unit is sensitive to the light of the second light source. In this way, the fine target detection unit therefore does not pick up the light of the second light source, and the coarse target detection unit does not pick up the light of the infrared light source.

Preferably, all the optical and electrical elements of the various units are located on the carrier. It is, however, also possible for individual elements of one or more units to be located on a base or in an intermediate unit, and to be connected to the carrier by fiber-optic lines. Such elements are, for example, laser sources or beam splitters and detectors.

Preferably, in another embodiment of the invention, a survey camera sensitive at least in the visible range is provided for coarse localization of the measuring aid with the aid of light in the visible range. It preferably has a larger viewing angle than the coarse target detection unit. It is therefore possible to carry out a three-stage method for localizing and tracking the measuring aid, by first searching for the measuring aid using the survey camera, then aligning the carrier with the measuring aid, and then acquiring the measuring aid with the coarse target detection unit and subsequently with the fine target detection unit.

In the method for operating the coordinate measuring device, the carrier is aligned with the measuring aid by rotation about the at least two axes of the carrier according to the fine position, the coarse position and optionally also measurement values of the survey camera.

Other preferred embodiments may be found in the dependent patent claims. Features of the method claims may be combined as appropriate with the device claims, and vice versa.

BRIEF DESCRIPTION OF THE DRAWINGS

The subject-matter of the invention will be explained in more detail below with the aid of preferred exemplary embodiments, which are represented in the appended drawings, in which.

Figure 1:
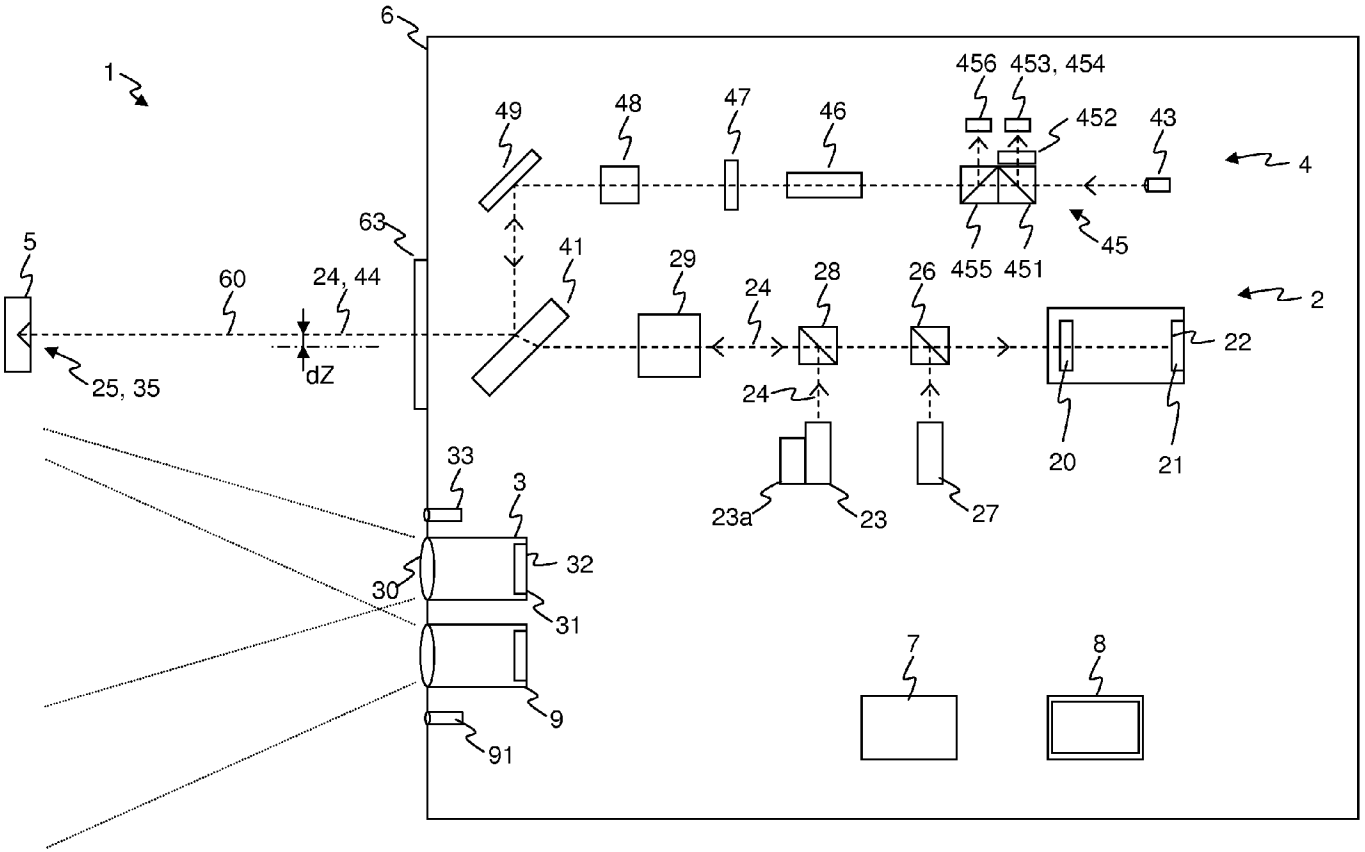
FIG. 1 schematically shows essential components and the beam path in a coordinate measuring device according to the invention.

The references used in the drawings, and their meaning, are summarized in the list of references. Fundamentally, in the figures, parts which are the same are provided with the same references.

DETAILED DESCRIPTION OF THE INVENTION

FIG. 1 schematically shows the beam path in a coordinate measuring device 1 in a preferred embodiment of the invention. The essential elements of the coordinate measuring device 1 are arranged in or on a carrier 6, preferably in a common housing. A fine target detection unit 2 generates a first target beam, preferably an infrared target beam 24, and a distance measuring apparatus 4 generates a measurement light beam 44. The two beams emerge through common exit optics 63, and preferably travel coaxially along a measurement axis 60. Arranged on the carrier, there are furthermore a coarse target detection unit 3 comprising a second light source 33, and a survey camera 9. A closed loop and open loop control unit 7 detects and processes the measurement values of various answers and controls axial position motors for alignment of the carrier 6. A display apparatus 8 shows information about measurements and the device status, and can also display images of one of the image sensors provided, in particular the survey camera 9.

In a measurement mode or tracking mode, the coordinate measuring device 1, or the carrier 6, is aligned with a measuring aid 5, for example a retro-reflector such as a triple mirror or a corner cube prism. The two beams are reflected thereon and visible as an infrared target point, or first target point 25 for the coordinate measuring device 1, and respectively as a second target point 35 for the distance measuring apparatus 4. The second target point 35 is geometric, and, as seen from the measuring device 1, visible at least approximately or even exactly at the same position in space as the first target point 25. Conceptually and in terms of wavelength range, however, the two points 25, 35 are considered as different from one another.

In the example shown, the distance measuring apparatus 4 is an absolute distance measuring device, although it may also be an interferometer or a combination of the two. In it, a measurement light source 43 emits the measurement light beam 44. The latter travels through a first beam splitter 451 for splitting the emitted light and a second beam splitter 455 for deviating the returning light. The two beam splitters 451, 455 are part of a sensor unit 45. The deviated part of the emitted light is expanded by means of a beam expander 452 and sent onto two intensity sensors 453, 454. One of these intensity sensors 453 is used in a known way for closed loop amplitude control of the measurement light source 43, and the other 454 is used as an additional safety element for detecting an unacceptably high intensity.

The returning light deviated by the second beam splitter 455 is sent onto a detector 456. The intensity detected there is used in a known way to determine the absolute distance, for example according to the Fizeau principle. To this end, emerging and returning measurement light 44 passes through an electro-optical modulator 46, a quarter-wave plate 47, a beam expander 48, a deviating mirror 49 and a beam splitter 41, which respectively combines the measurement light beam 44 with the infrared target beam 24 of the fine target detection unit 2 and separates them again on the return path.

The fine target detection unit 2 comprises an infrared light source 23 which generates the first target beam, i.e. preferably the infrared target beam 24. Preferably, the infrared light source 23 is a superluminescent diode (SLED). A cooling element 23a, for example a Peltier cooling element, may be arranged in order to cool it. The infrared target beam 24 is coupled in via a second input coupling 28, and travels through an optional further beam expander 29 and the beam splitter 41 onto the measurement axis 60. The infrared light emitted by the infrared light source 23 is therefore coupled as a target beam 24 into the common beam path of the distance measuring apparatus 4 and of the fine target detection unit 2. In the second input coupling 28, the returning light corresponding to the infrared target point 25 is coupled out again and travels through first input coupling 26 and a first bandpass filter 20 onto the first position detection sensor 21. There, the fine position 22 of the image of the infrared target point 25 is generated on the first position detection sensor 21.

In the first input coupling 26, light from a pointer light source 27 is optionally also coupled in and travels as a beam in the common beam path of the distance measuring apparatus 4 and of the fine target detection unit 2. This light of the pointer light source 27 is in the visible range, so that the measurement axis 60 also becomes visible for an operator when striking an object. In this case, wavelengths of about 380-750 nm are considered as the visible range. The transition to the IR range lies between 700 nm and 800 nm.

The coarse target detection unit 3 comprises a second position detection sensor 31. Light from the second light source 33, which may comprise a single light source or a plurality of individual light sources, is emitted with a relatively large emission angle. Preferably, the second light source 33 is a superluminescent diode (SLED). The emission angle, after emission optics 30 of the second light source 33, is somewhat greater than the viewing angle range of the coarse target detection unit 3, which is more than 3° or more than 10° or more than 15° or up to around 30° (i.e. ±15°). The measuring aid 5 is therefore visible for the coarse target detection unit 3 even when it has not been detected in the fine target detection unit 2. The reflection of the light from the second light source 33 is visible and measurable as a coarse position 32 on a second position detection sensor 31 of the coarse target detection unit 3. With the aid of this measurement, the carrier 6 is aligned with the measuring aid 5 until the fine target detection unit 2 detects its own infrared target beam 24. Subsequently, the fine position 22 is used in order to follow the measuring aid 5 (tracking).

If the measuring aid 5, for example with a triple mirror, reflects the received light back exactly, the second light source 33 must be arranged close to the entry optics of the coarse target detection unit 3.

In order to avoid mutual interference of the fine target detection unit 2 and the coarse target detection unit 3, they preferably operate in different wavelength ranges of the infrared spectrum. For example, the fine target detection unit 2 comprises a first bandpass filter 20 having a first transmission range, and the coarse target detection unit 3 comprises a second bandpass filter 30 having a second transmission range, the two transmission ranges not overlapping. For example, the two wavelength ranges are 890-920 nm for the fine target detection unit 2 and 835-865 nm for the coarse target detection unit 3. Furthermore, the first bandpass filter 20 filters out measurement light of the distance measuring apparatus 4 (from the measurement light source 43), which passes through the beam splitter 41 to the fine target detection unit 2 and could interfere therewith.

Besides the light in the IR range, the second light source 33 can furthermore also emit light in the visible range and thereby also serve as illumination for the survey camera 9. The survey camera 9 may also have its own illumination 91 for emitting light at least in the visible range.

Figure 2:
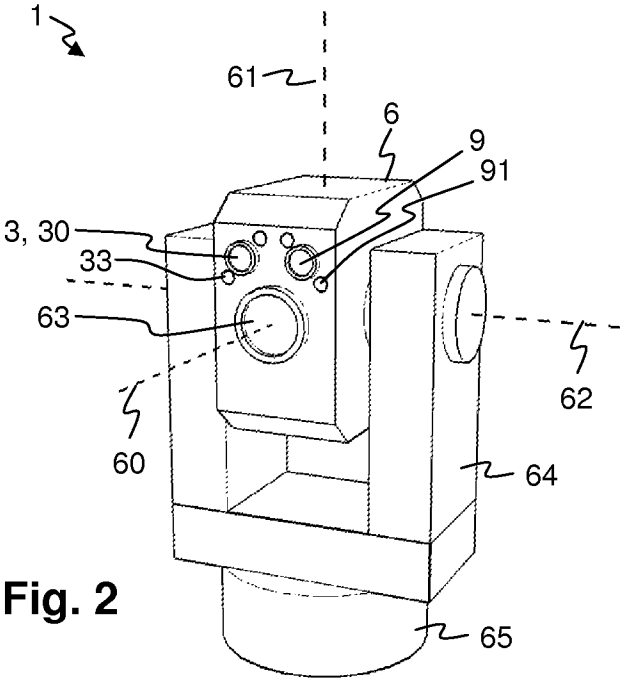
FIG. 2 schematically shows an external structure of a coordinate measuring device.

FIG. 2 schematically shows the external structure of a coordinate measuring device 1 comprising the elements already described: exit optics 63, coarse target detection unit 3 here comprising two second light sources 33 on two sides of the entry optics of the coarse target detection unit 3, and the survey camera 9 with its illumination 91, here likewise comprising two individual light sources on two sides of the entry optics of the survey camera 9. Also shown are: the measurement axis 60, a tilt axis 62 about which the carrier 6 can be inclined relative to an intermediate carrier 64, and a swivel axis 61 about which the intermediate carrier 64 can be rotated relative to a base 65.

LIST OF REFERENCES

1 coordinate measuring device
2 fine target detection unit
20 first bandpass filter
21 first position detection sensor
22 fine position
23 infrared light source
23a Peltier cooling element
24 infrared target beam
25 infrared target point
26 first input coupling
27 pointer light source
28 second input coupling
29 beam expander
3 coarse target detection unit
30 second bandpass filter, emission optics
31 second position detection sensor
32 coarse position
33 second light source
35 second target point
4 distance measuring apparatus
41 beam splitter, semitransparent mirror
43 measurement light source
44 measurement light beam
45 sensor unit
46 electro-optical modulator
47 quarter-wave plate
48 beam expander
49 deviating mirror
5 measuring aid
6 carrier
60 measurement axis
61 swivel axis
62 tilt axis
63 exit optics, cover disk
64 intermediate carrier
65 base
7 open loop, closed loop control
8 display apparatus
9 survey camera
91 illumination for survey camera

The invention claimed is:

1. A coordinate measuring device, comprising:

a carrier which can be rotated about at least two axes relative to a base, the carrier being automatically alignable with a spatially mobile measuring aid by means of a closed loop control arrangement by rotation about these at least two axes, wherein the coordinate measuring device comprises:

at least one optical distance measuring apparatus for measuring the distance to a spatially mobile measuring aid;

at least one *first* light source for emitting light directly or via optical elements, this light being visible as a *first* target point when reflected by the measuring aid;

at least one *fine* target detection unit for determining a *fine* position as the position of an image of the *first* target point on a position detection sensor;

*a second light source for emitting light, this light being visible as a second target point when reflected by the measuring aid; and*

*a coarse target detection unit for determining a coarse position as the position of an image of the second target point on a second position detection sensor; wherein* the closed loop control arrangement being adapted to align the carrier with the measuring aid by rotation about the at least two axes of the carrier according to [a] *the* fine position and [a] *the* coarse position; and

*at least one of* the *first and the second* light source being a superluminescent diode (SLED)*;* and wherein at least one set of exit and/or entry optics of the at least one optical distance measuring apparatus, the [at least one] *first* light source[,] *and* the [at least one] *fine* target detection unit[, the closed loop control arrangement and the light source] are arranged so that said optics can be moved together on the carrier.

2. The coordinate measuring device as claimed in claim 1, [further comprising] *wherein*:

[as a light source, a first light source in the form of an SLED, in the infrared range, and optical elements for emitting light from this first light source as a first target beam, the target beam being visible as a first target point when reflected by the measuring aid;

a fine target detection unit for determining the fine position as the position of the image of the first target point on a first position detection sensor,] the fine target detection unit and the distance measuring apparatus [comprising] *have* common exit optics.

3. The coordinate measuring device as claimed in claim 2, [comprising] *wherein*:

[as a light source, a] *the* second light source [in the form of an SLED, which] emits light at least in the infrared range[, this light being visible as a second target point when reflected by the measuring aid;

a coarse target detection unit for determining the coarse position as the position of the image of the second target point on a second position detection sensor].

4. The coordinate measuring device as claimed in claim 3, wherein the coarse target detection unit is only sensitive to light in the infrared range.

5. The coordinate measuring device as claimed in claim [3] *1*, wherein the coarse target detection unit has an aperture angle of more than 3°.

6. The coordinate measuring device as claimed in claim [3] *1*, wherein the fine target detection unit and the coarse target detection unit are sensitive in mutually separate ranges of the infrared spectrum, the fine target detection unit is sensitive to the light of the [infrared] *first* light source and the coarse target detection unit is sensitive to the light of the second light source.

7. The coordinate measuring device as claimed in claim 6, wherein the fine target detection unit comprises a first bandpass filter having a first transmission range, the coarse target detection unit comprises a second bandpass filter having a second transmission range, the two transmission ranges do not overlap, and the first bandpass filter filters out measurement light of the distance measuring apparatus.

8. The coordinate measuring device as claimed in claim 2, wherein the light emitted by the [infrared] *first* light source is coupled as a target beam into the common beam path of the distance measuring apparatus and of the fine target detection unit.

9. The coordinate measuring device as claimed in claim 8, wherein an optical axis of the fine target detection unit extends outside the coordinate measuring device coaxially with the optical axis of the distance measuring apparatus on a common measurement axis.

10. The coordinate measuring device as claimed in claim 8, wherein the optical axes of the fine target detection unit and of a coarse target detection unit do not extend coaxially outside the carrier.

11. The coordinate measuring device as claimed in claim [2] *1*, wherein the fine target detection unit has an aperture angle of less than 3°.

12. The coordinate measuring device[)] as claimed in claim 1, wherein the optical distance measuring apparatus is an absolute distance measuring device or an interferometer, or a combination of the two.

* * * * *